Feb. 16, 1954          E. B. DODGE          2,669,119
METHOD OF TESTING PNEUMATIC TIRE COMPONENTS
Filed April 27, 1951          4 Sheets-Sheet 1
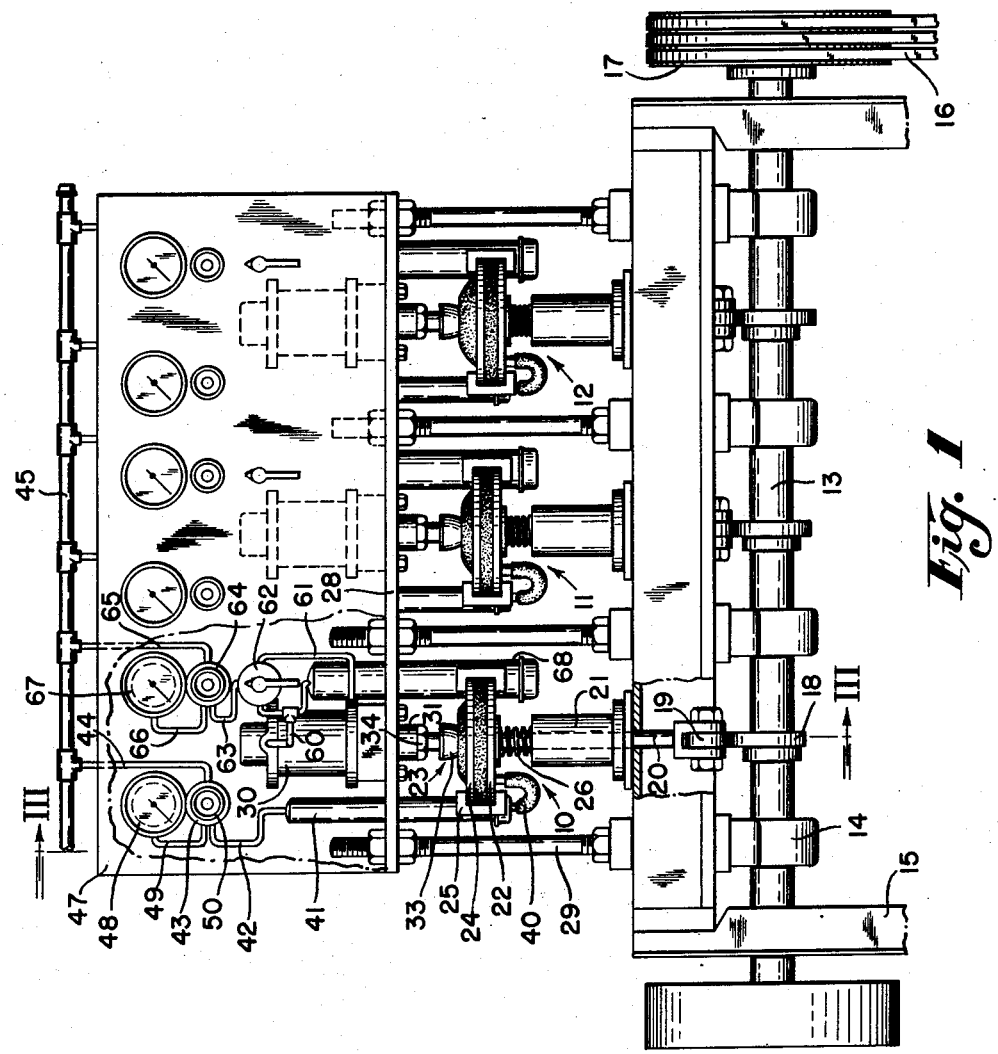
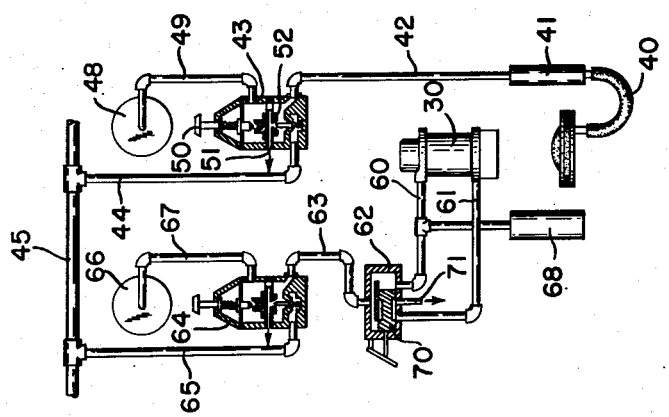
INVENTOR.
ERNEST B. DODGE
BY Feb. 16, 1954     E. B. DODGE     2,669,119
METHOD OF TESTING PNEUMATIC TIRE COMPONENTS
Filed April 27, 1951     4 Sheets-Sheet 3

INVENTOR.
ERNEST B. DODGE
BY James J. Long
Agent

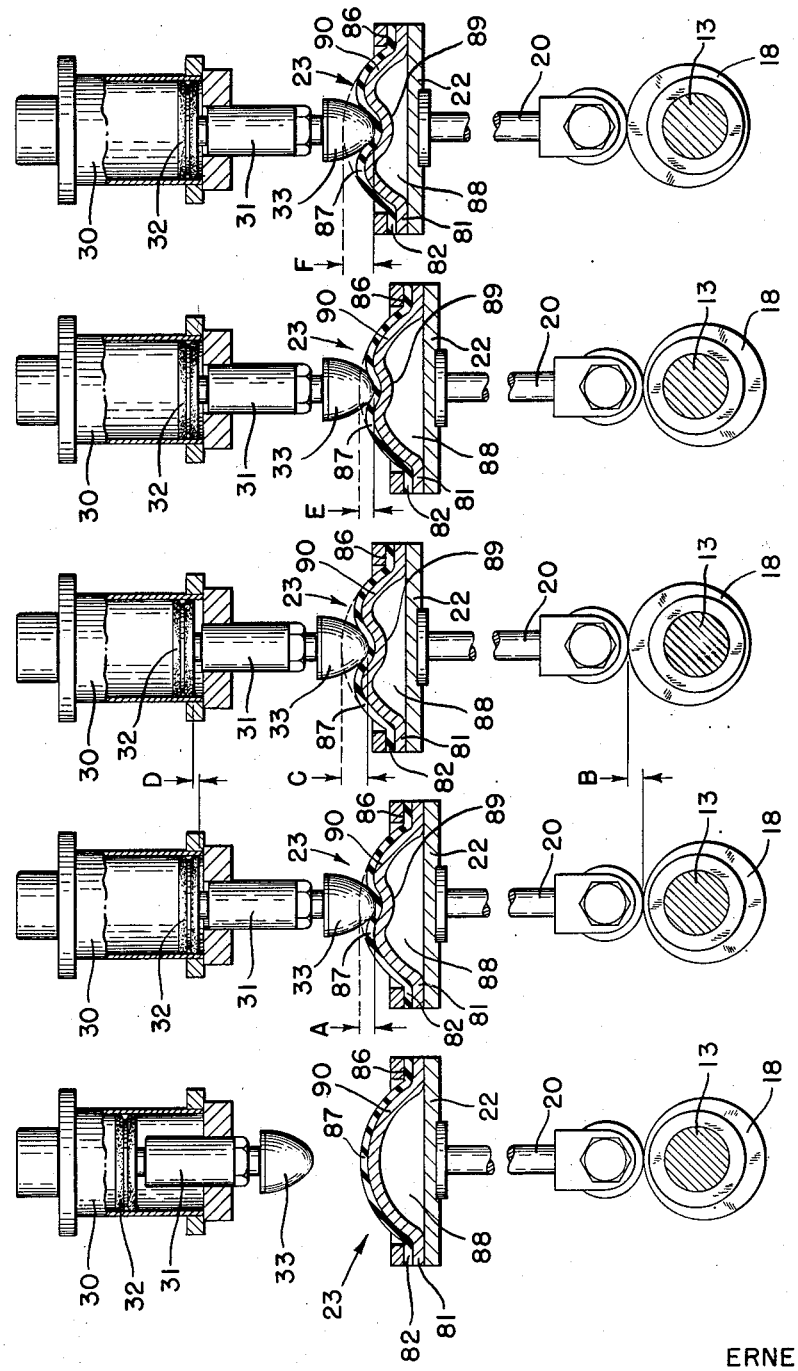

Patented Feb. 16, 1954

2,669,119

UNITED STATES PATENT OFFICE 2,669,119

METHOD OF TESTING PNEUMATIC TIRE COMPONENTS

Ernest B. Dodge, Detroit, Mich., assignor to United States Rubber Company, New York, N. Y., a corporation of New Jersey Application April 27, 1951, Serial No. 223,417

7 Claims. (Cl. 73—100)

1

This invention relates to an improved method for testing the components of a pneumatic tire as assembled in operable relation.

The most reliable method available at the present time for testing the behavior of the structural components of a pneumatic tire is to actually build a full scale tire and test it by running it under controlled conditions on a test wheel, or more preferably, by actually running the tire on a vehicle, over road surfaces of definite character and under definite conditions of speed and loading. Such testing involves considerable expense because of the amount of labor and time necessary to build the tire and test it. This has been a serious handicap to the development of new and improved tire materials and methods of manufacture, since the evaluation and introduction of any new practice in tire manufacture is necessarily accompanied by a thorough test program to make certain that the proposed departure from conventional practice will actually result in a tire having the desired performance characteristics. It has therefore been desired to provide a test method which would predict in the laboratory the behavior of a tire, to a greater extent than has heretofore been possible, without necessity for constructing an actual tire and subjecting it to expensive test wheel and road tests.

Accordingly, a principal object of the invention is the provision of a test method which can be carried out more economically and more quickly than the usual test wheel and road tests.

Another object of the invention is to provide a method of testing the performance of tire components without actually building a full scale tire.

Still another object is the provision of a method for testing the structural components of a tire in which the structural components are assembled and shaped in a manner simulating the actual tire building practice.

A further object is to provide a test method which imposes on the test piece stresses and strains of such character that the test results correlate well with the performance of actual tires on test wheel and road tests.

The manner in which the invention accomplishes the foregoing objects, as well as additional objects and advantages, will be made evident in the following detailed description of the invention, which is intended to be read with reference to the accompanying drawings, wherein:

2

Fig. 1 is a front elevational view, with portions broken away, of a machine suitable for carrying out the method of the invention;

Fig. 2 is a piping diagram of certain pneumatic components of the machine of Fig. 1;

Figs. 8 to 12 inclusive are diagrammatic sectional elevational views showing how the test piece is deflected at various stages of the test.

Figure 3:
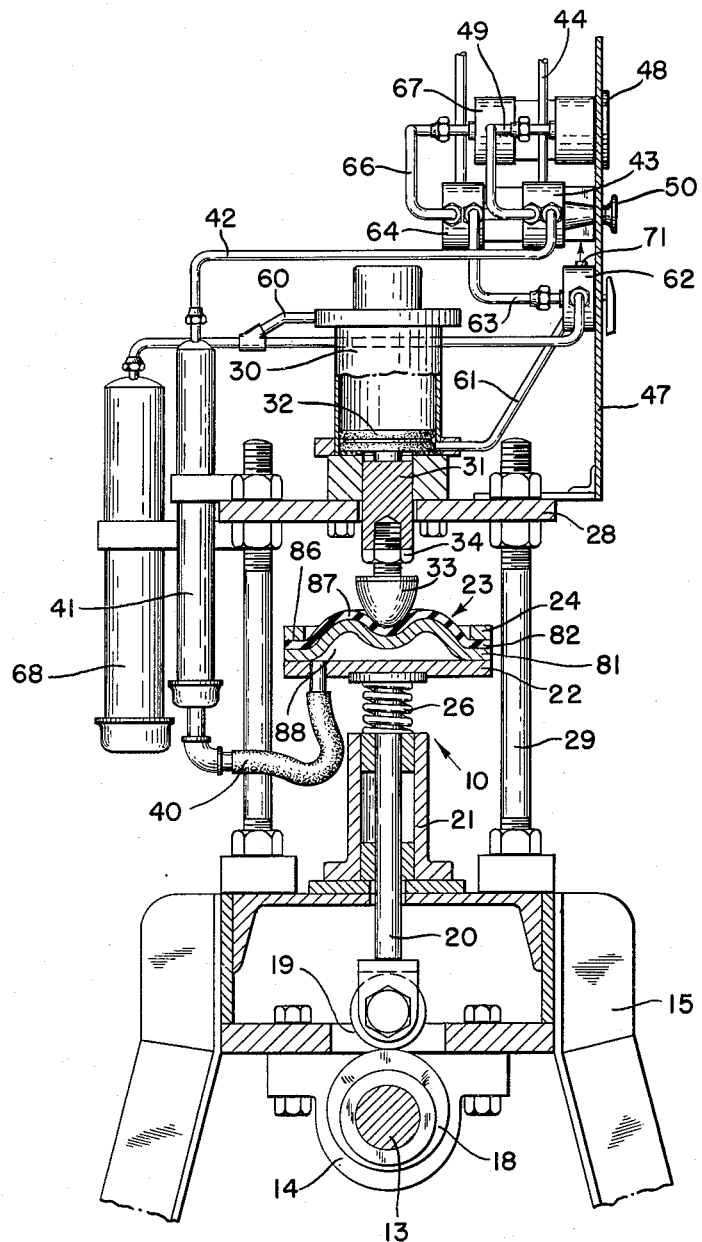
Fig. 3 is a transverse elevational view of the machine, taken partly in section along line III—III of Fig. 1.

The invention contemplates the construction of a vulcanized test sample which is of small scale and simplified construction as compared to an actual tire, but in which various essential components of the tire are assembled in relative positions corresponding to their operative positions in a tire, and in which the components of the test piece are subjected, prior to vulcanization, to stresses and distortions substantially simulating the stresses and distortions to which an actual tire is subjected when it is initially built up in the form of a flat band, and thereafter shaped into annular toroidal form. Most conveniently, the test sample is typically assembled initially in the form of flat pieces of tire fabric which are superimposed one on another, each piece representing one ply of a tire, and the whole assembly of plies representing a tire carcass. A piece of vulcanizable rubber tread stock or sidewall stock, representing the tire tread or sidewall, is placed on top of the laminated carcass plies and the resulting assembly is then deformed as a unit so as to form a definite protrusion or curved area in the test piece. Such protrusion is typically a circular dome, although it may also be oval or other suitably curved shape, and this deformation has for its purpose the duplication in the sample of the stresses and distortions of the character imposed on a raw tire carcass as it would actually be built. In other words, an actual tire would be built by laying flat strips of tire fabric on a tire building drum to form the carcass in the form of a band, and thereafter a substantially flat tread and sidewall portion would be placed on the carcass, and after removal of the resulting tire band from the drum, the band would be shaped into annular toroidal form, usually in a vacuum shaping box, prior to vulcanization.

The test piece is then vulcanized in the distorted shape, typically in dome shape, and after cooling it is ready for testing. The test is carried out by exerting air pressure against the interior surface of the dome of the sample while confining the sample at its marginal edges, thereby simulating in the test piece the inflation of an actual tire. The test piece is then subjected to a cyclic strain, that is, to a rapidly repeated strain, of a frequency and magnitude designed to reproduce the type of strains to which a tire is subjected in use. Such cyclic strain is conveniently imposed by repeatedly urging the test piece against a suitable obstacle, or deflection imposing means, that is maintained against the central area of the outer surface of the dome of the test piece. This causes the dome to be deflected inwardly against the internal inflation pressure for a definite distance at each stroke of the test piece. During the initial period of the test, the deflection imposing means is spring loaded, that is, the deflection imposing means is yieldingly supported by a suitable resilient means which exerts a definite yielding pressure against the test piece in such manner that the deflection imposing means is enabled to "give" or yield a controlled amount against the force exerted by the test piece. This is termed the "spring load" portion of the test. The deflection imposing means may be considered as corresponding to a road surface against which the tire is continuously deflected. This resilient yielding of the deflection imposing means simulates the action of the springs of a vehicle on which the tire is mounted. The resilient yielding is suitably of a magnitude corresponding approximately to the average amount which a vehicle spring would yield under typical loading conditions on an average road surface.

The repeated deflection of the test piece will cause internal heat to be generated therein, just as in a pneumatic tire. The rise in temperature in the sample will be accompanied by a tendency for the sample to become soft and to deflect more easily. If the test is continued for a sufficient period of time under these conditions, the test piece will usually approach a critical temperature at which it becomes too soft and yielding to move the resiliently supported deflection imposing means. It has been found that the test frequently yields information about the behavior of the test piece that correlates most closely with actual road test performance, if, prior to arriving at the aforesaid critical temperature, the pressure exerted on the resilient deflection imposing means is increased to a value such that the deflection imposing means cannot yield as the test piece is urged against it. This is termed the "unsprung load" portion of the test, and the test is continued under these conditions until the test piece fails. Although the test may be continued until the test piece fails by an actual "blowout," that is, by an actual rupture of the sample with accompanying loss of internal inflation pressure, it is unnecessary to continue the test to this point, for a more informative indication of failure is obtained by continually measuring the temperature in the interior of the test piece as the test proceeds. When a sudden drop in the internal temperature of the test piece is observed, it may be assumed that the test piece has failed, and if the test is discontinued and the test piece is cut open at this point, the nature of the failure can be observed visually, for example, in the form of a definite separation between the plies of the carcass, or between the carcass and the tread, or by a breaking or fraying of the carcass cords themselves, or by separation of the cords from the surrounding carcass stock.

A suitable apparatus for carrying out the test is shown in Figs. 1 to 3, and comprises a plurality of testing units 10, 11 and 12, all of which are driven by a common cam shaft 13 supported longitudinally in bearings 14 within the base framework 15 of the machine, and rotated by driving belts 16 passing over a pulley 17 carried at one end of the cam shaft. The belts 16 pass to a suitable driving motor (not shown). The cam shaft is provided with a cam 18 for each of the test units. Since the three test units 10, 11 and 12 are identical in construction, only one of the units need be described in detail. On each unit the cam 18 engages a cam follower 19 carried on the lower end of a vertical rod 20 that is slidably mounted for vertical reciprocating movement in a vertical bearing sleeve 21 fixed to the upper surface of the framework 15. The upper end of the rod 20 carries a flat horizontal circular plate 22 on the upper surface of which a test sample 23 is secured by means of a superimposed retaining ring 24 and a series of spaced U-shaped clamps 25 (Fig. 1) which frictionally engage and grip the edges of the plate 22 and ring 24. A compression spring 26 is disposed around the rod 20 between the lower face of the plate 22 and the upper end of the sleeve 21.

A horizontal plate 28 supported above the frame 15 on upwardly extending tie rods 29 carries on its upper surface a double acting pneumatic cylinder 30 from which there extends downwardly a plunger rod 31 secured to the piston 32 of the cylinder 30. The lower end of the plunger rod 31 carries a rounded head 33, the position of which may be adjusted by threading it into or out of the plunger. The plunger head 33 may be fixed in a desired position by tightening a set nut 34.

For inflating the dome shaped test piece 23 with a definite predetermined internal pressure, an air line 40 passes from the lower side of the supporting plate 22 to a relatively enlarged relief tank 41 that is in turn connected by an air line 42 to a control valve 43, whence an air line 44 passes to a supply manifold 45 that is supplied by a conventional air compressing system (not shown). The control valve 43 is conveniently supported on a control panel 47 supported from the horizontal frame member 28 in an upright position at the upper front portion of the machine. A pressure gauge 48, also mounted on the panel 47, is connected to the low pressure side of the control valve 43 by means of an air line 49. The control valve 43 is such that it may be set, by adjustment of a setting knob 50 thereon, to produce in the lines 49, 42, the chamber 41, the line 40 and inside the test sample 23, a predetermined pressure of reduced value compared to the pressure in the supply manifold 45. The valve 43 is of the self bleeding type, that is, it includes an automatic bleed orifice 51 (Fig. 2), the operation of which is controlled by a resilient diaphragm 52 within the valve, and which acts to bleed air out of the system if the air pressure should exceed the predetermined value at which the control valve was originally set. Such valves are commercially available and are described in U. S. Patent 2,359,236.

Air lines 60 and 61 pass from the upper and lower ends, respectively, of the pneumatic cylinder 30 to a four way manually operated control valve 62, that is mounted on the control panel 47 and that is supplied with reduced air pressure from a line 63 passing from an automatic pressure controlling valve 64. The valve 64 is similar to the automatic controlling valve 43, and it is connected by a line 65 to the supply manifold 45. A pressure gauge 66 connected to the low pressure side of the automatic control valve 64 by a line 67 indicates the pressure in the cylinder 30. A surge tank or reservoir 68 is provided in communication with the line 60 leading to the upper end of the cylinder 30 to prevent rapid fluctuation of the air pressure in the cylinder 30 as the piston 32 is reciprocated by the test piece 23. The piston 32 of the cylinder 30 may be raised or lowered as desired by applying air pressure to either the lower line 61 or the upper line 60, respectively, by manually positioning the core 70 of the valve 62 in either of its two operating positions. In the position shown in Fig. 2, the core 70 is positioned to the left, and air pressure is applied to the upper line 60 to lower the piston 32, while the line 61 connected to the lower end of the cylinder 30 is permitted to exhaust air through an exhaust port 71 of the valve. When the valve core 70 is moved to the right, air pressure will be applied to the lower line 61 to raise the piston 32, and air will be exhausted from the upper end of the cylinder 30 through the line 60 and the exhaust port 71.

Figure 4:
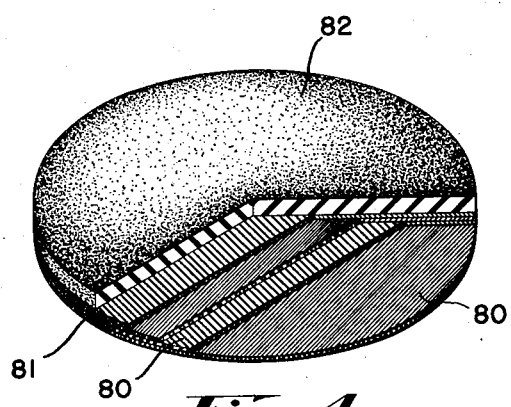
Fig. 4 is a perspective view of a test piece in process of construction, with parts broken away.
Figure 6:
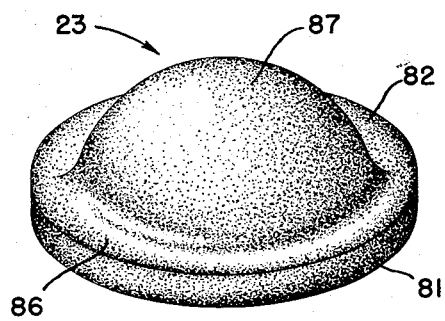
Fig. 6 is a perspective view of a mold test piece.

The preparation of the test specimen or sample 23 will now be described in conjunction with Figs. 4 to 6 inclusive. A plurality of layers of rubber coated tire fabric 80 are superimposed one on another and are pressure rolled firmly together to form the lower portion 81 of the test sample representing the tire carcass. The successive plies 80 are usually arranged so that the cords or other reinforcing elements in alternate plies run transversely to each other, as is indicated in the broken away portion of Fig. 4. This simulates actual tire building practice. The layers or plies 80, in this case four plies, correspond in number and structure to the particular tire construction which it is desired to test. For example, the plies may be composed of cotton cord, or rayon, nylon, wire cable, or any other material that it is desired to test. The cords are typically previously solutioned with the usual latex-resin composition, or any other composition which it may be desired to evaluate by means of the test, and they are friction coated or skim coated just as in tire manufacture. If desired, additional layers or plies representing breaker plies or shock pads may be included.

There is then superimposed on the carcass portion 81 a rubber composition 82 representing the outer casing of the tire, and this rubber portion may be made of tire tread stock, or sidewall stock, or a combination of the two stocks corresponding to what is known as the cap and base construction in the tire building art. The particular stocks or combinations thereof selected will depend on whether it is desired in the test to simulate the action of the sidewall of the tire, or of the tire tread, and on the particular type of construction which it is desired to test.

Figure 5:
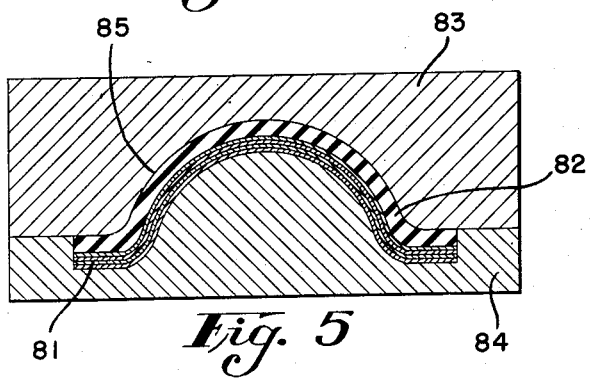
Fig. 5 is a sectional elevational view of a mold for molding a test piece.
Figure 7:
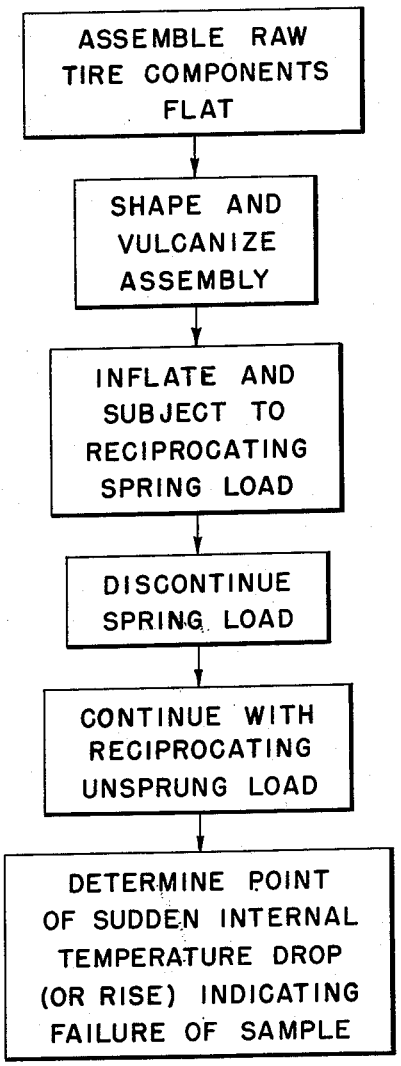
Fig. 7 is a flow diagram representing the essential steps of one method of carrying out the invention.

The assembly is then placed in a mold consisting, as shown in Fig. 5, of upper and lower mold halves 83 and 84 which together define a dome shaped mold cavity 85 in which the sample, under the influence of heat and pressure applied by a suitable platen or pot heater press (not shown), acquires a dome shape. As the test piece is deformed from the flat shape shown in Fig. 4 to the dome shape shown in Fig. 6, the components of the test piece are subjected to strains similar to the strains imposed on a tire carcass when it is shaped. The test piece is vulcanized in the mold cavity 85 by heating. The test piece is vulcanized to the same state of cure to which an actual tire would be cured. After removal from the mold, the test piece has the shape shown in Fig. 6, that is, it is composed of a peripheral flat portion 86 and a central protruding area or dome 87. The test piece, after cooling, is now ready for mounting in the test machine.

The operation of the test machine is as follows. Before inserting the test piece 23 in the machine the plunger head 33 is threaded upwardly or downwardly until it is so positioned that it will produce in the dome of the test piece a definite value of deflection. This is usually accomplished with the piston 32 of the cylinder 30 in its lowest position and with the sample supporting plate 22 in its lowest position, and with a gauge piece of definite thickness resting on the upper surface of the plate 22 to serve as a guide to the proper position of the plunger head 33. When the machine is properly set, the test piece 23 is then mounted with the flat portion 86 thereof between the plate 22 and the clamping ring 24. The sample is held in position with the clamps 25, and air under pressure is admitted through tank 41 to the chamber 88 (Fig. 3) formed between the plate 22 and the interior of the dome 87 of the test piece.

This represents the inflation pressure of a tire and is set at the desired value by adjustment of the knob 50 of the automatic pressure control valve 43 while observing the pressure indicated on the gauge 48. The valve 43 automatically maintains the desired inflation pressure throughout the test. The air pressure on the piston 32 within the cylinder 30 is adjusted, by manipulation of the automatic pressure control valve 64, to such a value that each upward stroke of the test piece produces a definite lifting of the plunger head 33 against the pneumatic pressure exerted on the piston 32 by the air in the upper portion of the cylinder 30. The shaft 13 is then rotated at a suitable speed through the driving belts 16 and pulley 17, causing the rod 20 to move up and down by the action of the cam 18 on the cam shaft 13. This moves the dome 87 of the test piece 23 carried on the surface of the supporting plate 22 repeatedly against the plunger head 33, with consequent repeated deflection of the dome 87. The plunger head 33, in place of being rigidly supported, is pneumatically spring-loaded, and this spring action simulates the action of the springs of a vehicle in response to deflection imposed on the tire by the road surface.

As the test proceeds under these conditions the components of the test piece 23 are subjected to repeated flexing and rapidly reversing stresses and strains of much the same character as those to which a tire is subjected in actual use. Internal heat will be generated within the test piece, just as in a tire. However, the inflation pressure within the sample will not increase as a result of this increase in temperature because the automatic pressure control valve 43 will automatically release small amounts of air from the chamber 88 and tank 41 to maintain the inflation pressure constant. The action of the air chamber 41 is such as to provide a relatively large volume of air in communication with the air within the test piece, thereby practically eliminating fluctuations of air pressure which would otherwise occur as the sample is reciprocated.

The internal temperature of the test piece is observed continually as the test proceeds. Such temperature may be determined by momentarily stopping the machine and piercing the crown portion of the test piece to an appropriate depth with a needle or probe carrying on its end a thermocouple connected to a potentiometer which serves to indicate the temperature. Such piercing of the sample by the probe is only partial, and has no deleterious effect on the test. As the temperature increases in the course of the test, the test piece will generally tend to approach a temperature at which it becomes too soft and flexible to produce the same amount of lifting of the plunger head 33 as was produced when the test was first begun. In other words, the deflection of the dome 87 as it is urged against the plunger head 33 will ultimately tend to increase because the dome becomes too readily deformable to lift the plunger upwardly against the pneumatic pressure on the piston 32. This represents a condition of the sample wherein the deflection of the dome tends to increase without any increase in load. The internal temperature of the sample at which this occurs corresponds to the maximum temperature attained in tires in the course of conventional wheel tests. It has been found that the test gives results which correlate most satisfactorily with actual performance of tires if the spring loading of the plunger is discontinued before the test piece attains a temperature sufficiently elevated to result in the increased deflection without increase in load. In accordance with a preferred method of practicing the invention, the spring loading of the plunger is discontinued at this stage, and the test is continued while exerting sufficient downward force on the plunger to prevent it from being lifted upwardly by the test piece. Stated in other words, the test is continued with a positively applied deflection, under what may be termed an unsprung load condition. This is accomplished by increasing the air pressure in the upper portion of the cylinder 30 by manipulating the control valve 64 until the pressure on the piston 32, as indicated by the gauge 66, is sufficient to prevent the plunger head 33 from being lifted by the pressure exerted against it by the dome 87 of the test piece.

The test is continued under these conditions while periodically measuring the internal temperature of the sample. Failure of the test piece is almost invariably indicated by a sudden decrease in the temperature of the sample, e. g., a sudden temperature drop of 4 to 10°. In some cases, usually when there is inferior material in the dome, there may be observed a sudden temperature rise, which also indicates failure of the sample, and which is invariably followed by a sudden temperature drop. The test may be discontinued at this point and the elapsed time since the start of the test taken as a comparative measure of the durability of the components tested. If desired, the test may be continued until an actual "blowout" or rupture of the test piece takes place, but this is unnecessary since no additional useful information is obtained thereby. Upon completion of the test, the sample may be removed and cut open to determine the type of failure which has occurred.

From the foregoing it is evident that the invention provides a method of testing the various components of pneumatic tires. The test operation is carried out conveniently and economically in the laboratory on a small scale sample analogous to an actual tire in its structural components and its method of assembly, shaping and curing.

As indicated in Figs. 8 to 12, the deflection imposed on the sample during the test is usually made up of a static component, as determined by the initial setting of the vertical position of the plunger head 33, and a dynamic component, as determined by the eccentricity of the cam 18 which reciprocates the sample holding plate 22. The static deflection, indicated as distance A in Fig. 9, is represented by the amount the dome 87 is deflected downwardly from its normal position by the plunger head 33 when the piston 32 is at the bottom of the cylinder 30 and the sample supporting table 22 is at its lowermost position. The dynamic deflection, indicated as distance B in Fig. 9, is represented by the increase in the inward deflection of the dome 87 as the sample supporting table 22 is elevated from its lowermost to its uppermost position. The total deflection of the sample, indicated as distance C in Fig. 10, is the sum of the static deflection plus the dynamic deflection. During the spring load portion of the test, that is, during the initial portion of the test when the plunger 33 is lifted by the sample, the total deflection of the sample is decreased by an amount equal to the magnitude of the plunger lift indicated by distance D in Fig. 10. From this it will be seen that the spring load portion of the test is less severe in its action on the sample than the subsequent unsprung load portion, wherein there is no plunger lift and the total deflection is therefore at a maximum. It will also be seen that the spring loading is, in effect, what might be termed a resilient or yielding of the original static deflection that is superimposed on the dynamic deflection during the first portion of the test. Thereafter, in the unsprung load period, the static deflection superimposed on the dynamic deflection is essentially unyielding or rigid.

In the initial period of the test, the load imposing obstacle, against which the test piece is continuously deflected, is resiliently supported to simulate the action of the springs of a vehicle. As indicated above, an advantageous feature of the most preferred form of the test involves discontinuing the foregoing spring-loaded portion of the test before a critical elevated temperature range is attained in the sample, and the test is thereafter continued under unsprung loading conditions, with the deflection imposing obstacle relatively rigidly supported against yielding to the test piece. This feature of the invention has been found to result in more close correlation with the test results of actual tire performance than has heretofore been possible in laboratory tests, insofar as the inventor is aware.

It is usually found that the relative duration of the spring load portion of the test has a highly significant bearing on the character of the results obtained by the test. Thus, in a given series of identical test pieces, if the spring load period is appreciably shorter than a certain critical optimum value, it will be observed that the elapsed time before failure of the individual identical test pieces varies over a relatively short range for example, a 5 or 10 minute range. On the other hand, if the duration of the spring load period appreciably exceeds the optimum value, the elapsed time before failure of the samples will have too great a range, for example, a range of 60 to 90 minutes. In other words, the reproducibility of the test will be poor. However, for a certain optimum value of the duration of the spring load portion of the test, the individual samples in the series are observed to fail within an optimum range, typically within a range of 20 to 30 minutes, that is, the test is observed to be highly reproducible. It has been found that in all cases the critical optimum point for discontinuing the spring load portion of the test and continuing with the unsprung load corresponds to the point at which there begins to develop in the test piece a temperature sufficiently elevated to result in increased deflection of the test piece without any increase in load. With test pieces made of conventional components of pneumatic tires, having a thickness of approximately 3/8–3/4 inch, and a diameter of approximately 6 to 8 inches, and a height of approximately 3 to 6 inches, measured from the lower surface of the sample to the upper surface of the undeflected dome, and imposing on the sample a static deflection of the order of approximately 1/4 to 1/2 inch, and a dynamic deflection of approximately 1/2 to 1 1/2 inches, while permitting a plunger lift of approximately 1/4 to 3/4 inch, at an inflation pressure of approximately 24 to 110 p. s. i., at a frequency of approximately 350 to 750 strokes per minute, the most satisfactory time for the duration of the sprung load portion of the test was found to be about 45 minutes. As a general guide, it may be stated that in any given instance the optimum duration of the spring load portion of the test according to the preferred practice of the invention may be determined by running a test specimen under spring load conditions as described above until the plunger lift begins to decrease. This indicates that the optimum time has been exceeded, and on future samples, a spring load period of slightly less than this, say 15% to 20% less, is utilized for most satisfactory results.

The loading to which the test piece is subjected according to the invention simulates the stresses and strains which take place in actual use of a tire, since the test piece is continually forcibly deflected from a normal curved shape into an indented or reversely curved form against internal pneumatic pressure, just as in a tire. Thus, as indicated in Figs. 8 to 12, as the plunger head 33 engages the dome 87 of the test piece 23 it deforms a central area 89 of the dome from a normally upward curve to a downward curve which is the reverse of the normal shape of the dome. Adjacent to the central area 89 of the dome there is produced a point of definite reverse flexure 90, where the cords of the carcass are subjected to severe bending stresses of the kind encountered in a tire casing in use. The upper portion of the test piece, particularly the tread, is subjected to tension at the area of flexure 90, while the lower or inner portion of the test piece is subjected to compression. The foregoing stresses continually vary between fixed limits during the test with a frequency depending on the rate of reciprocation of the test piece.

In order to illustrate the manner in which the test method of the present invention may be utilized to predict the effect of a given variable on the performance of a tire, the following detailed example is given:

*Example*

In this example the effect on certain aspects of tire performance of using carcass rubber stocks of different viscosities was determined. Three groups of vulcanized test domes were made up as described above. The domes had 10 plies in the carcass, made of rayon tire fabric and coated with carcass stock in the conventional manner. The three groups of domes were identical in all respects except that the carcass stocks in the three groups were made up using rubbers having three different Mooney viscosities (viz. 83.5, 65, and 37.5). The domes were 6 inches in diameter and had a thickness of 3/4" (7/16" of this representing the carcass and 5/16" representing the tread). The height of the molded dome was 3" measured from the lower surface of the test piece to the outer surface of the dome. This construction was intended to represent a heavy service tire (9.00–20).

The test pieces were placed in the test machine shown in Figs. 1 to 3 as described above and inflated to 35 pounds air pressure. The machine was adjusted to produce a 3/4" reciprocating motion in the sample at a speed of 650 cycles per minute. The vertical position of the plunger head 33 and the air pressure in the upper portion of the cylinder 30 (about 44 pounds) were such as to produce in the dome a static deflection of 1/2" and a dynamic deflection of 3/4", or a total of 1 1/4" deflection. The machine was run for 45 minutes under these spring load conditions and then the air pressure in the cylinder 30 was increased to 67 pounds. This produced a static deflection in the dome of 3/4", indicated at E in Fig. 11, which, added to the 3/4" dynamic deflection, gave a total deflection of 1 1/2" indicated at F in Fig. 12, for the succeeding unsprung load portion of the test. The test was continued under these conditions, with short pauses of approximately 10 seconds at 10 minute intervals while a probe carrying a thermocouple connected to a potentiometer was inserted into the sample to a depth of 5/8" to determine the internal temperature of the sample. When a sudden temperature drop of about 4–8° was observed, indicating that the sample had failed, the test was discontinued, and the test pieces were removed from the machine to be cut open and inspected for types, number, and location of failures. The samples were in all cases noted to have failed by separation of adjacent carcass plies from each other, or by separation between the shock pad and the tread, or from both of these causes. The results of the test are summarized as follows:

|  | Average Length of Run, Feet | Average Temperature at Failure, °F. | Total Number of Separations Observed in 6 domes | |
|---|---|---|---|---|
|  |  |  | Carcass Separations | Shock Pad-Tread Separations |
| Group I (made with 83.5 Mooney stock) | 145 | 321 | 20 | 5 |
| Group II (made with 65 Mooney stock) | 203 | 286 | 15 | 3 |
| Group III (made with 37.5 Mooney stock) | 123 | 309 | 36 | 10 |

The foregoing results show that the carcass plies of the domes made with medium viscosity stock (group II) were superior to those made with either the high viscosity (group I) or lower viscosity (group III) stocks, in respect to resistance to separation, since the medium viscosity stock ran for an appreciably longer period of time without failure, and also the number of separations, either between plies or between shock pad and tread, was significantly less than in either of the other cases. Also, the temperature at failure of the group II stock was lower than that of group I or group III, indicating that the group II stock was superior with respect to heat build-up. From this test it is concluded that the viscosity of the stock has a marked effect on tendency of the tires to fail as a result of separation, and that a medium viscosity stock gives superior results in respect to resistance to separation and heat build-up compared to a high or low viscosity stock. These conclusions are confirmed by test wheel and road tests made on actual tires.

While the invention has been described with particular reference to a preferred practice thereof involving subjecting the sample to a spring loaded deflection period of definite duration, followed by an unsprung loaded period, the test may also be carried out, in appropriate cases, utilizing spring loading throughout the test or unsprung loading throughout the test. Thus, the behavior of test specimens made from certain components may in some instances conform most closely to actual tire performance when the testing conditions are relatively mild throughout the test, in which case it may be appropriate to utilize spring loading throughout the test. On the other hand, other test specimens may correlate more closely with actual tire performance when the test conditions are relatively severe, in which case it may be appropriate to utilize unsprung loading throughout the test.

Having thus described my invention, what I claim and desire to protect by Letters Patent is:

1. A method of testing components of a pneumatic tire which comprises subjecting a test piece composed of components of a tire assembled in operable relation to repeated spring-loaded deflections during an initial portion of the test and thereafter subjecting the test piece to deflections without spring loading until the test piece fails.

2. A method of testing components of a pneumatic tire which comprises repeatedly forcibly deflecting a test piece composed of components of a tire against a resiliently supported deflection-imposing means which yields resiliently as said test piece if forced against it, continuing said repeated deflections until the internal temperature of the test piece approaches a temperature at which the deflection of the test piece tends to increase without any increase in force on the test piece, and thereafter continuing said repeated deflections while restraining said resiliently supported deflection-imposing means from yielding as the test piece is forced against it.

3. A method of testing components of a pneumatic tire which comprises applying air pressure to one side of a test piece composed of components of a tire assembled in operative position, repeatedly forcibly deflecting said test piece inwardly against said air pressure by a deflection-imposing means that is supported by air pressure sufficiently low to permit a definite resilient yielding of said deflection-imposing means at each imposed deflection, said deflections producing a rise in the internal temperature of the test piece, continuing to impose said deflections until the internal temperature of the test piece approaches a temperature at which the magnitude of the deflection of the test piece tends to increase without any increase in the said supporting air pressure for said deflection-imposing means, thereafter increasing the air pressure supporting said deflection-imposing means to a value sufficient to prevent said deflection-imposing means from yielding as the test piece is deflected against it, and continuing said repeated deflections of the test piece.

4. A method of testing components of a pneumatic tire which comprises applying air pressure to one side of a test piece composed of components of a tire assembled in operative position, repeatedly forcibly deflecting said test piece inwardly against said air pressure by a deflection-imposing means that is supported by air pressure sufficiently low to permit a definite resilient yielding of said deflection-imposing means at each imposed deflection, said deflections producing a rise in the internal temperature of the test piece, continuing to impose said deflections until the internal temperature of the test piece approaches a temperature at which the magnitude of the deflection of the test piece tends to increase without any increase in the said supporting air pressure for said deflection-imposing means, thereafter increasing the air pressure supporting said deflection-imposing means to a value sufficient to prevent said deflection-imposing means from yielding as the test piece is deflected against it, and continuing said repeated deflections of the test piece while continually measuring the internal temperature of the sample test piece until a sudden drop in said temperature is observed, indicating failure of the test piece.

5. A method of testing components of a pneumatic tire which comprises applying air pressure to one side of a test piece composed of components of a tire assembled in operative position, said air pressure being maintained constant throughout the test, repeatedly forcibly deflecting said test piece inwardly against said air pressure by a deflection-imposing means that is supported by air pressure sufficiently low to permit a definite resilient yielding of said deflection-imposing means at each imposed deflection, said deflections producing a rise in the internal temperature of the test piece, continuing to impose said deflections until the internal temperature of the test piece approaches a temperature at which the magnitude of the deflection of the test piece tends to increase without any increase in the said supporting air pressure for said deflection-imposing means, thereafter increasing the air pressure supporting said deflection-imposing means to a value sufficient to prevent said deflection-imposing means from yielding as the test piece is deflected against it, and continuing said repeated deflections of the test piece.

6. A method of testing components of a pneumatic tire which comprises assembling a test piece of the components of a tire in operable relation in the flat, shaping said assembly into a curved shape to simulate therein the strains produced in a flat tire band when it is shaped into tire form, vulcanizing the assembly in said curved shape, and subjecting the curved shape to reciprocating resiliently-loaded deflections during an initial period of the test and thereafter subjecting said curved shape to positive deflections without resilient loading until the test piece fails.

7. A method of testing pneumatic tire components which comprises assembling a test piece composed of components of a pneumatic tire, distorting the test piece into dome shape to simulate therein the distortions which occur when a pneumatic tire is built in the form of a flat band and subsequently formed into tire shape, vulcanizing the test piece in said dome shape, subjecting said dome to reciprocating dynamic deflections and simultaneously applying yielding static deflection during an initial period of the test and subsequently discontinuing said yielding static deflection and applying rigid static deflection while continuing said dynamic deflections, and continually measuring the internal temperature of the dome until the test piece fails.

ERNEST B. DODGE.

References Cited in the file of this patent

UNITED STATES PATENTS

| Number | Name | Date |
|---|---|---|
| 1,408,159 | Ayres | Feb. 28, 1922 |
| 1,478,532 | Schafer | Dec. 25, 1923 |
| 1,762,164 | Eger | June 10, 1930 |
| 2,412,524 | Mallory | Dec. 10, 1946 |